United States Patent
Reimert et al.

[19]

[11] Patent Number: 6,056,324
[45] Date of Patent: May 2, 2000

[54] THREADED CONNECTOR

[75] Inventors: Larry E. Reimert; James S. Britton, both of Houston, Tex.

[73] Assignee: Dril-Quip, Inc., Houston, Tex.

[21] Appl. No.: 09/076,748

[22] Filed: May 12, 1998

[51] Int. Cl.[7] .................................................. F16L 35/00
[52] U.S. Cl. ......................... 285/18; 285/334; 285/382.2; 29/446
[58] Field of Search .................................... 285/917, 333, 285/334, 355, 390, 18, 382–2; 29/446

[56] References Cited

U.S. PATENT DOCUMENTS

| | | |
|---|---|---|
| 4,153,283 | 5/1979 | Hellmund et al. ....................... 285/334 |
| 4,402,532 | 9/1983 | Henn . |
| 4,576,402 | 3/1986 | Murray et al. . |
| 4,601,491 | 7/1986 | Bell, Jr. et al. . |
| 4,647,085 | 3/1987 | Anderson et al. . |
| 4,692,988 | 9/1987 | Shuiver et al. ...................... 285/334 X |
| 4,697,829 | 10/1987 | Pond . |
| 4,717,183 | 1/1988 | Nobileau . |
| 4,720,124 | 1/1988 | Taylor et al. . |
| 4,786,090 | 11/1988 | Mott . |
| 4,796,923 | 1/1989 | Liggins et al. ....................... 285/334 X |
| 4,944,538 | 7/1990 | Read ....................................... 285/334 |
| 5,044,676 | 9/1991 | Burton et al. . |
| 5,062,667 | 11/1991 | Miller et al. . |
| 5,505,502 | 4/1996 | Smith et al. . |

FOREIGN PATENT DOCUMENTS

| | | |
|---|---|---|
| 803637 A2 | 10/1997 | European Pat. Off. . |
| 2033518 | 1/1983 | United Kingdom . |
| 2064041 | 7/1983 | United Kingdom . |
| 2099529 | 7/1984 | United Kingdom . |
| 2087022 | 8/1984 | United Kingdom . |
| 2113335 | 1/1985 | United Kingdom . |
| 2113334 | 11/1985 | United Kingdom . |
| 2138089 | 9/1986 | United Kingdom . |
| 2148439 | 10/1987 | United Kingdom . |
| 2302381 | 5/1998 | United Kingdom . |

*Primary Examiner*—Dave W. Arola
*Attorney, Agent, or Firm*—E. Richard Zamecki

[57] ABSTRACT

Method and apparatus are disclosed to complete a threaded connection between two connector members by relative rotation between the connectors, utilizing fluid pressure between them to overcome radial load resistance during make up by rotation, and thereafter to produce axial and radial loading in the completed connection, but without otherwise applying longitudinal forces to drive the two connectors together to make up the threaded connection. In a disclosed embodiment, a pin connector has a tapered neck with external threads, and a box connector has a collar with a tapered interior, featuring tapered threads. The pin neck is received within the box collar, and the two sets of threads are made up by relative rotation between the pin and box. When a stall position is reached due to radial resistance forces, two combinations of bump and ramp seals provide a sealed zone between the sets of threads. Fluid pressure is applied in the sealed zone to radially contract the neck and expand the collar without breaking the sealing engagement between the bump seals and the ramp seals. The resulting reduction of radial resistance between the neck and collar allows the further threading of the pin and box together by rotation between them until load surfaces of the pin and box mutually engage. Subsequent release of the fluid pressure from the sealed zone allows the pin neck to expand and the box collar to contract, moving the two sets of threads together, and radially loading the engagement at the seals. The load surfaces of the pin and box threads are slanted so that a wedging action is produced that further axially loads the connected pin and box.

20 Claims, 3 Drawing Sheets

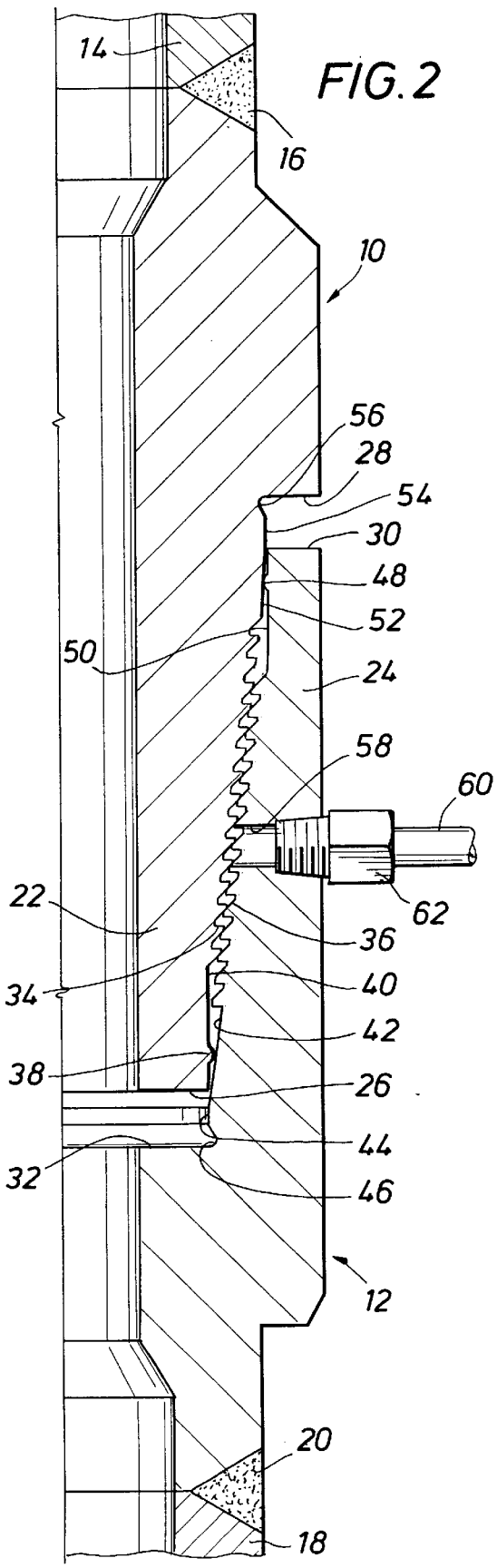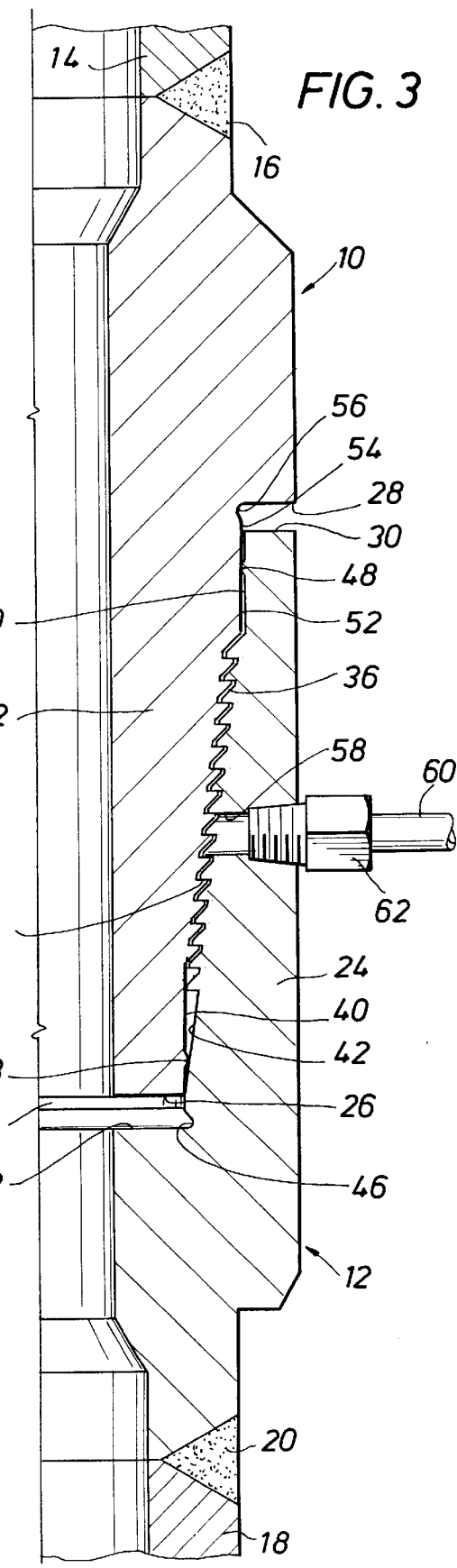

THREADED CONNECTOR

TECHNICAL FIELD

The present invention relates to techniques for connecting together tubular members and the like. More particularly, the invention relates to methods and apparatus for making threaded connections between connector members by relative rotation between the connectors, and using fluid pressure between the connectors to produce axial and radial loading in the completed connection, but without the need to apply axial forces to drive the connectors together.

BACKGROUND OF THE INVENTION

Strings of tubular members, or pipes, are utilized in many applications, and are particularly important in the oil and gas industry. In offshore as well as land operations for drilling and production, for example, connections between pipes in a string must provide both structural strength and fluid pressure integrity. Typical connectors available include the threaded type, breach block connectors, and snap lock connectors. Some connectors use heat, fluid pressure, or mechanical force to obtain a shrink fit, in some cases overriding threads or annular teeth carried by the connectors. In some cases complex tools or other machinery are required to complete such connections.

Threaded connections between pipe members are typically made by providing one end of one pipe member with a male connector in the form of an externally threaded pin member, and providing the end of the second pipe member with a female coupler in the form of an internally threaded box member which receives the pin member. The pin and box members may be integral parts of their respective pipe members, or may be added thereto by welding or threaded engagement, for example. Various ad constructions are known, including tapered threads and straight threads, for example.

It is desirable and advantageous to provide a technique for connecting together pipe members that is relatively quick, that provides great structural strength for the connection, that provides a connection of great fluid pressure integrity, and that does not require complex additional machinery or tools to carry out. The present invention provides method and apparatus for achieving all of these advantages.

SUMMARY OF THE INVENTION

The present invention provides method and apparatus for completely making up a threaded connection between two threaded connectors by relative rotation between the two connectors, utilizing fluid pressure between them to overcome radial load resistance during make up by rotation, and thereafter to produce axial and radial loading in the completed connection by releasing the fluid pressure, but without applying longitudinal forces to otherwise drive the two connectors together to make up the threaded connection.

A pin connector having a neck with tapered, external threads, may be stabbed into a box connector having a collar with tapered, internal threads, until stab flanks of the external threads contact stab flanks of the internal threads. Rotational motion of the pin relative to the box, for example, meshes the threads and screws the neck of the pin into the collar of the box. Two combinations of bump seals and corresponding conical seal surfaces, or ramp seals, seal the neck to the collar on opposite axial sides of the meshed threads, establishing a generally annular sealed zone between the internal and external threads, and between the bump seals.

As the neck is advanced into the collar by threading, the bump seals advance along the ramp seals, increasing the radial load resistance between the bump seals and the corresponding ramp seals. Torque is applied to rotate the pin relative to the box until the increased radial load resistance at the bump seals stalls the rotation of the pin. Fluid pressure is applied to the sealed zone through a port in the collar, for example, to radially contract the neck and radially expand the collar, reducing the radial load resistance at the bump seals. The pin may then be further advanced into the box by rotation and continued threading. As the bump seals continue to advance along the ramp seals, increasing the radial load resistance, additional fluid pressure may be applied to the sealed zone to reduce the radial load resistance so that the pin may continue to be advanced into the box by the threading process.

The pin is thus advanced into the box by threading until load surfaces of the pin and box contact, in addition to contact between the internal threads and the external threads. The pin includes at least one, generally annular, axial load surface, and the box includes a like number of generally annular, axial load surfaces. Thus, a first, generally annular, axial load surface may be included as part of the pin, and a second, generally annular, axial load surface may be included as part of the box such that the pin load surface contacts the box load surface when the pin is completely threaded into the box. Further, the pin may include a third, generally annular, axial load surface and the box may include a fourth, generally annular, axial load surface such that the third and fourth axial load surfaces mutually contact when the first and second axial load surfaces mutually contact.

More particularly, the pin may include generally annular, axial load surfaces in the form of an end face at the leading end of the neck and a load shoulder at the opposite end of the neck; the box may include generally annular, axial load surfaces in the form of an end face at the leading end of the collar and a load shoulder at the opposite end of the collar. The pin may thus be advanced into the box until the end face of the pin contacts the load shoulder of the box, and the end face of the box contacts the load shoulder of the pin. Then, release of fluid pressure from the sealed zone allows the neck to radially expand and the collar to radially contract, forcing the internal threads and the external threads into closer meshing. Slanted load flanks on the internal threads wedge together with slanted load flanks on the external threads, adding axial loading between the axial load surfaces of the pin and the axial load surfaces of the box in contact with the pin axial load surfaces. Further, with the four axial load surfaces as described above, axial loading is generated between the pin load shoulder and the box load shoulder, as well as between the two sets of threads. Also, radial movement of the neck and collar together upon release of fluid pressure from the sealed zone increases the radial load resistance at the bump seals.

The connector assembly including the pin and box connectors may further comprise a cylindrical seal surface, or ring seal, at the end of each of the two ramp seals so that, with the corresponding axial load surfaces of the pin and box in mutual contact, such as the end face of the pin contacting the load shoulder of the box and the end face of the box contacting the load shoulder of the pin, each bump seal is in sealing engagement with a corresponding cylindrical seal surface.

More particularly, the connector assembly including the pin and box connectors may include an external bump seal on the pin neck between the end face of the pin and the external threads, and an external conical seal surface, or ramp seal, on the neck between the load shoulder of the pin and the external threads, and may include an internal bump seal on the box collar between the end face of the box and the internal threads, and an internal conical seal surface, or ramp seal, on the collar between the load shoulder of the box and the internal threads. An internal cylindrical seal surface may be included at the end of the ramp seal on the collar toward the load shoulder of the box, and an external cylindrical seal surface may be included at the end of the ramp seal on the neck toward the load shoulder of the pin, so that the bump seal on the neck is in sealing engagement with the cylindrical seal surface on the collar, and the bump seal on the collar is in sealing engagement with the cylindrical seal surface on the neck, when the end face of the pin contacts the load shoulder of the box and the end face of the box contacts the load shoulder of the pin. Release of fluid pressure from the sealed zone then increases the radial load resistance between the bump seals and the corresponding cylindrical seal surfaces as the neck expands radially and the box contacts radially.

The completely made up connection between the box connector and the pin connector according to the present invention ma be broken out by relative rotation between the pin and the box to unthread the two connectors without application of axial forces to otherwise pull the two connectors apart. With the threaded connection completely made up, and both axial preload on the axial load surfaces of the two connectors and radial loading at the bump seals, fluid pressure applied to the sealed zone radially contracts the neck and radially expands the collar to reduce the radial load resistance at the bump seals to allow relative rotation between the two connectors to break out the threaded connection. Application of fluid pressure also moves the pin threads and the box threads radially apart, reducing the wedging of the pin thread load flanks with the box thread load flanks, and thereby reducing the axial loading between the corresponding axial load surfaces of the pin and the box.

The combinations of bump seals and ramp seals, or cylindrical seal surfaces, used to establish the sealed zone provide sealing in both directions: during make up of the threaded connection, sealing the applied fluid pressure within the sealed zone against leakage into the interior of the pin and box, and against leakage to the exterior of the pin and box; and, at completed make up, sealing fluid within the interior of the pin and box, as well as fluid exterior to the pin and box, against leakage into the sealed zone. Further, a threaded connection made up according to the present invention is effectively locked against break out due to the axial preloading and radial load resistance achieved by release of fluid pressure from the sealed zone. Also, a string of two or more tubular members, having pin and box connectors according to the present invention at opposite ends of the tubular members, may be made up by threadedly connecting the tubular members by rotation therebetween, with application of fluid pressure according to the present invention. The present invention provides connections between pipe members without the need of complex tools or other machinery, using just a source of fluid pressure and a torque tool that is typically found on a drilling rig, for example.

BRIEF DESCRIPTION OF DRAWINGS

FIG. 2 is a fragmentary view in partial section of the pin and box connectors of FIG. 1, showing the pin positioned within the box in the initial stab position;

FIG. 3 is a view similar to FIG. 2, but showing the pin threaded into the box in the stall position.

DETAILED DESCRIPTION OF THE PRESENTLY PREFERRED EMBODIMENT

Figure 1:
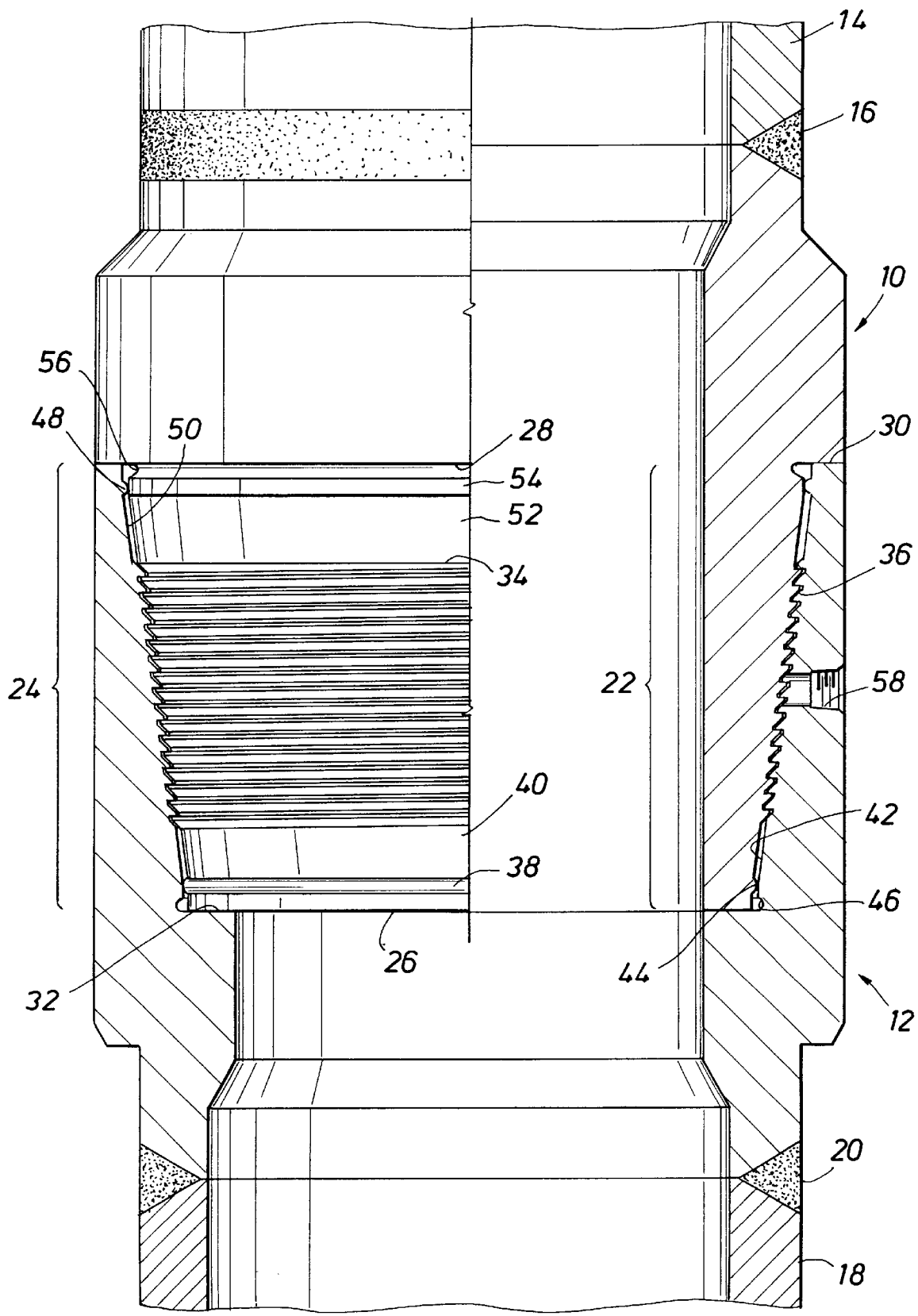
FIG. 1 is a longitudinal sectional view of a connector assembly according to the present invention, showing a box connector in cross section and a pin connector in quarter section, with the pin and box completely made up in threaded connection.

A connector assembly according to the present invention is shown in FIG. 1, and partially in FIGS. 2 and 3, comprising a pin connector, indicated generally at 10, and a box connector, indicated generally at 12. The pin 10 and the box connector 12 are illustrated at various stages in the process of threadedly connecting the two connectors together. Further, the pin 10 is shown joined to the end of a tubular member 14 as by welding 16, and the box 12 is shown joined to the end of a second tubular member 18 as by welding 20. Consequently, connecting the pin 10 and the box 12 joins the two tubular members, or pipes, 14 and 18. It will be appreciated that the pin 10 and box 12 can be joined to respective tubular members other than by welding, and further that the pin may be formed as an integral upset end of a tubular member, and the box may also be formed as an integral upset end of a tubular member. In general, the pin 10 and the box 12 are tubular themselves, so that the internal passages of the tubular members 14 and 18 continue through the connectors when the latter are mutually connected. Finally, a tubular member (not shown) may be equipped with a pin 10 on one end, and a box 12 on the other end, so that two or more such connector-equipped tubular members may be mutually joined, according to the present invention, into a string of tubular members. Thus, strings of drill pipe, well casing, production pipe, or any other type of tubing may be assembled using connectors and method according to the present invention.

The connectors 10 and 12 are constructed so that a portion of the pin connector may be received within a portion of the box connector, and the two connectors may be connected together ultimately by relative rotational motion between them. In the illustrated embodiment, the pin 10 includes a neck 22 and the box 12 includes a collar 24 such that the pin neck is received within the box collar. The radially outer surface of the pin neck 22 is partially frustoconical. With the perspective of the pin 10 entering the box 12, the leading end of the pin is a radially-extending, annular end face 26 at the narrower end of the neck 22; an exterior, radially-extending, annular load shoulder 28 is located at the other, trailing end of the neck. Therefore, the neck 22 is the portion of the pin 10 extending axially from the pin load shoulder 28 to the pin end face 26, as is indicated in FIG. 1. The radially inner surface of the box collar 24 is partially frustoconical. With the perspective of the box 12 partially enclosing the pin 10, the leading end of the box is a radially-extending, annular end face 30 at the thin-walled end of the collar 24; an interior, radially-extending, annular load shoulder 32 is located at the other, trailing end of the collar. Therefore, the collar 24 is the portion of the box 12 extending axially from the box load shoulder 32 to the box end face 30, as is indicated in FIG. 1. It will be appreciated particularly by reference to FIG. 1, wherein the connection between the pin 10 and the box 12 is illustrated as completely made up, that the length of the neck 22 and the length of the collar 24 are such that, in the completely made-up configuration, the pin end face 26 is landed against the is landed shoulder 32, and the collar end face 30 is landed against the pin load shoulder 28.

Alternatively, the connectors 10 and 12 may be provided with only one load shoulder, either the pin load shoulder 28 or the box load shoulder 32. Then, in the completely made up configuration, only one end face 26 or 30 contacts the one load shoulder 32 or 28 that is present.

The radially-outer surface of the neck 22 is formed with a set of tapered threads 34; the radially-inner surface of the collar 24 is formed with a set of tapered threads 36. The external pin threads 34 are generally complimentary to the internal box threads 36, at least to the extent that the two threads may be meshed to threadedly connect the pin 10 and the box 12 as discussed in detail below.

The pin neck 22 includes an external bump seal 38 toward the pin end face 26, spaced from the near end of the pin threads 34 by a smooth, tapered surface section 40. The neck bump seal 38 comprises a radially-outwardly extending annular ridge, with a rounded profile as seen in FIGS. 1–3. The box collar 24 includes an internal ramp sealing surface 42 between the box load shoulder 32 and the near end of the box threads 36. The box ramp seal 42 comprises an internal, generally frustoconical sealing surface, seen in profile in FIGS. 1–3 generally as a ramp, with the wider end of the surface toward the box threads 36, and which continues as an internal right circular cylindrical sealing surface 44 at the narrower end of the ramp seal surface. An undercut groove 46 is located between the radially-outermost extent of the box load shoulder 32 and the ring sealing surface 44.

The box collar 24 includes an internal bump seal 48 toward the box end face 30, spaced from the near end of the box threads 36 by a smooth, tapered surface section 50. The box bump seal 48 comprises a radially-inwardly extending annular ridge, with a rounded profile as seen in FIGS. 1–3. The pin neck 22 includes an external ramp sealing surface 52 between the pin load shoulder 30 and the near end of the pin threads 34. The pin ramp seal 52 comprises an external, generally frustoconical sealing surface, seen in profile in FIGS. 1–3 generally as a ramp, with the narrower end of the surface toward the pin threads 34, and which continues as an external right circular cylindrical sealing surface 54 at the wider end of the ramp seal surface. An undercut groove 56 is located between the radially-innermost extent of the pin load shoulder 30 and the ring sealing surface 54.

The shapes of the bump seals 38 and 48 are not limited to the rounded profiles illustrated herein; bump seals used in the present invention may, in general, include any profiles that provide sealing in cooperation with the corresponding ramp sealing surfaces 42 and 52. Various types of profiles of bump seals for use in the present invention may include, but are not limited to, convex curves of various radii and angular edges, for example.

Also, providing the cylindrical sealing surfaces 44 and 54 is optional; otherwise, the ramp seals 42 and 52 may continue through the illustrated locations of the corresponding cylindrical seal surfaces. Further, the undercut grooves 46 and 56 are useful for receiving foreign matter as the pin 10 and box 12 are completely threaded together, and may also provide some stress relief in the completely made up configuration, but are not essential to the construction and use of connectors according to the present invention.

The box 12 is broken by a partially threaded port 58, axially positioned in the region of the collar 24 where the box threads 36 are located, although the port may be located elsewhere along the collar, as discussed below. As shown in FIGS. 2 and 3, a fluid pressure communication line 60 may be connected to the port 58 by an appropriate fitting 62 which threadedly engages within the port and seals thereto for purposes discussed below. Both the port 58 and the fitting 62 may be tapered as shown, for example, to enhance the sealing of the fitting with the collar in the port.

Figure 4:
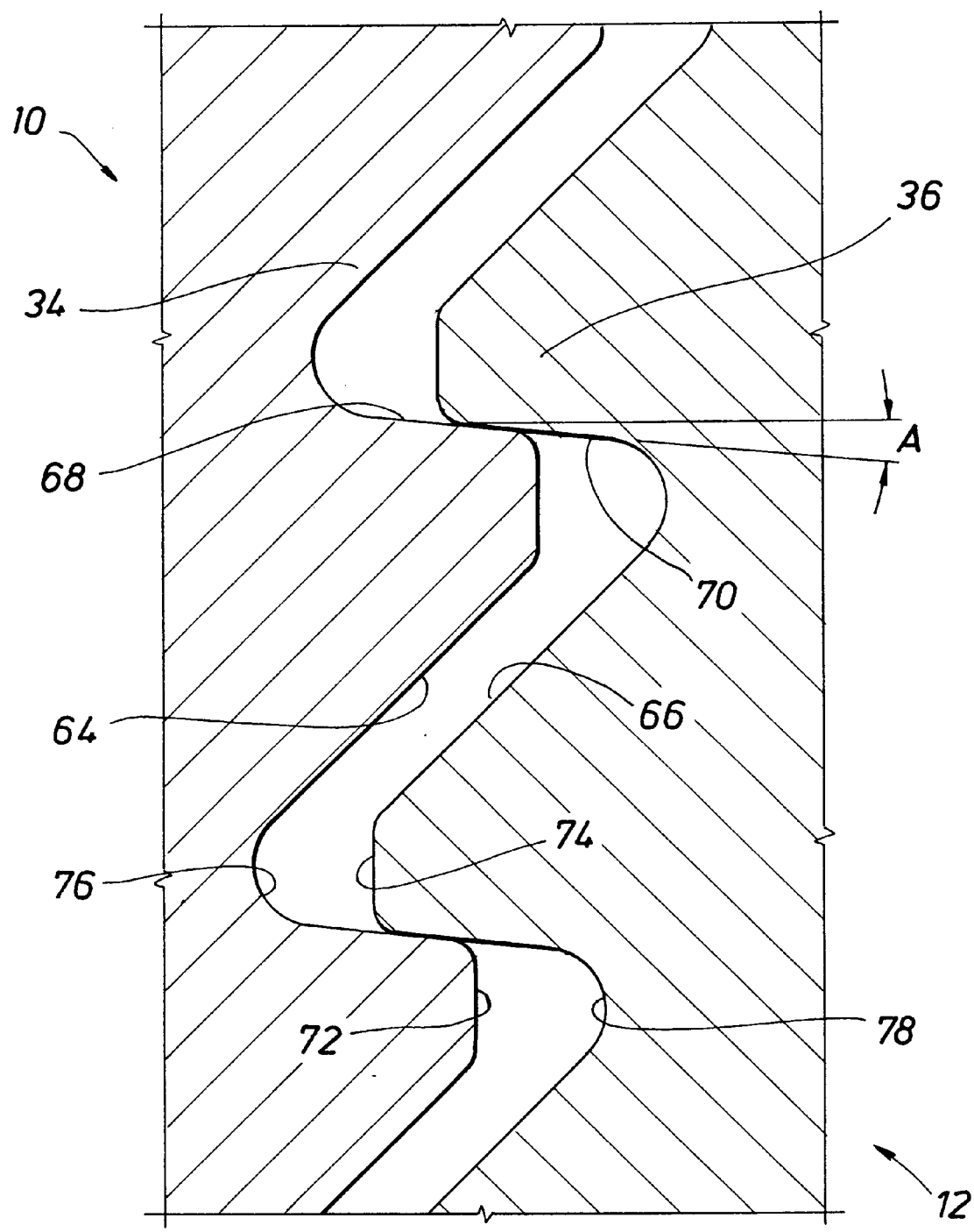
FIG. 4 is a fragmentary enlarged sectional view of the pin and box connectors of FIGS. 1–3, showing meshing of the pin and box threads with the radial spacing between the threads expanded by fluid pressure.

Details of the construction of the illustrated pin threads 34 and box threads 36 may be appreciated by reference to FIG. 4. Again with the perspective of the pin 10 entering the box 12, the pin threads 34 have slanted leading stab flanks 64, and the box threads 36 have slanted leading stab flanks 66. Also, the pin threads 32 have slanted trailing load flanks 68, and the box threads 34 have slanted trailing load flanks 70. The slant of the pin thread load flanks 68 is complementary to the slant of the box thread load flanks 70, with the angle of slant of these two load surfaces shown below a line perpendicular to the common longitudinal axis (not shown) of the pin 10 and the box 12 indicated by the angle A in FIG. 4. In the illustrated embodiment the angle A is five degrees. The slant of the pin thread stab flanks 64 is also complementary to the slant of the box thread stab flanks 66, with these two stab flank slants at an angle greater than angle A, as shown in FIG. 4. The pin threads 34 have flattened, or straight, crests 72, and the box threads 36 also have flattened, or straight, crests 74. Finally, the pin threads have rounded troughs 76, and the box threads also have rounded troughs 78.

As shown in FIG. 4, the profile of each of the pin threads 34 is generally that of a truncated wedge, as is the profile of each of the box threads 36. In the fully made up configuration shown in FIG. 1, with the pin connector 10 fully threadedly engaged with the box connector 12, the pin thread load flanks 68 are landed against the box thread load flanks 70, but the pin thread stab flanks are not in contact with the box thread stab flanks 66, the pin thread crests 72 remain separated from the box thread troughs 78, and the box thread crests 74 remain separated from the pin thread troughs 76, generally as shown in FIG. 4. However, as discussed below, in the fully made up configuration of FIG. 1 the threads 34 and 36 are meshed closer together compared to the arrangement illustrated in FIG. 4.

The process of connecting together the pin 10 with the box 12 begins by inserting, or stabbing, the pin neck 22 into the box collar 24. In a typical application in the oil field, for example, where the connection is being made between two pipes that are supported vertically, that is, on end, such as in the case of drill pipe, well casing, or production pipe, the tubular members being joined are normally oriented so that the box 12 is on the lower tube, facing upwardly, and the pin 10 is on the upper tube, facing downwardly, as shown in FIGS. 1–4.

The connectors 10 and 12 are moved together, and the pin neck 22 advances within the box collar 24, until the pin thread stab flanks 64 land against the box thread stab flanks 66, and the pin neck cannot move any farther into the box collar. This initial stab position is shown in FIG. 2. It will be appreciated that, in the initial stab configuration, the pin bump seal 38 has passed within the box threads 36 and reached the box ramp seal 42, and the box bump seal 48 has passed by the pin threads 34 and reached the pin ramp seal 52. Also, the slant of the box thread stab flanks 66 allows the pin end face 26 and the pin bump seal 38 to pass through the box threads 36 without interference, and the slant of the pin thread stab flanks 64 allows the box end face 30 and the box bump seal 48 to pass by the pin threads 34 without interference. Finally, although in the initial stab position of FIG.

2 the combination of the pin bump seal 38 with the box ramp seal 42, and the combination of the box bump seal 48 with the pin ramp seal 52, may provide one or two seals between the pin 10 and the box 12, such sealing is not initially utilized in making up the pin-and-box connection from that configuration.

After the initial stab position of FIG. 2 is reached, the pin 10 and the box 12 are rotated relative to each other, about their common, central longitudinal axis. Thus, with the box 12 held motionless, torque may be applied to the pin 10 to rotate the pin relative to the box. This relative rotation between the pin 10 and the box 12 causes the threads 34 and 36 to mesh, or threadingly engage, and the pin to be drawn further into the box. This resulting axial movement of the pin 10 into the box 12 causes the pin bump seal 38 to ride up the box ramp seal 42, and the box bump seal 48 to ride up the pin ramp seal 52. Since the two ramp seals 42 and 52 are slanted, or tapered, this movement of the bump seals 38 and 48 generates increasing radial forces between the bump seals and the respective ramp seals, producing sealing engagement therebetween. The farther the bump seals 38 and 48 move along the ramps seals 42 and 52, respectively, the greater are the radial forces that are generated between the bump seals and the ramp seals. These radial forces, however, while providing tighter sealing, also provide increasing radial load resistance, or frictional forces, at the bump seals 38 and 48, requiring the application of ever greater torque to further rotate and thread the pin 10 into the box 12. Eventually, the radial frictional forces are sufficiently great to match the torque that can be applied, or that is decided for safety or other reasons to be applied, to rotate the pin 10 relative to the box 12. The configuration of the pin 10 and the box 12 at that point is referred to as the stall position, illustrated in FIG. 3. No further rotation is available in the stall position to further advance the pin 10 into the box 12.

After the stall position is reached, fluid pressure is applied through the port 58 to relieve some of the radial load resistance, or frictional forces, between the bump seals 38 and 48, and the corresponding ramp seals 42 and 52 to allow the pin 10 to be further rotated into, and threaded with, the box 12. It will be appreciated that once the bump seals 38 and 48 establish sealing engagement with the ramp seals 42 and 52, respectively, a generally annular sealed zone is established between the pin 10 and the box 12. The sealed zone exists between the external surface of the pin 10 and the internal surface of the box 12 between the two bump seals 38 and 48. More particularly, the sealed zone is between the pin threads 34 and the box threads 36, and between the pin bump seal 38, in sealing engagement with the box ramp seal 42, and the box bump seal 48, in sealing engagement with the pin ramp seal 52. Further, the sealed zone includes the intersection of the port 58 with the interior surface of the box collar 24.

The fluid pressure communication line 60 is connected to the collar 24 by the fitting 62 threadedly and sealingly engaged in the port 58 in the stall position of FIG. 3. Then, fluid pressure is applied to the sealed zone by way of the line 62, connected to a conventional source (not shown) of hydraulic fluid, for example, under pressure. The effect of the fluid pressure build up in the sealed zone is to apply radial forces to the pin neck 22 and to the box collar 24, tending to separate the surfaces of the neck and the collar that are facing each other across the sealed zone. Thus, the neck 22 is contracted radially, the collar 24 is expanded radially, and the sealed zone is enlarged radially. Throughout the build up of fluid pressure in the sealed zone, and the accompanying contraction of the neck 22 and expansion of the collar 24, the bump seals 38 and 48 remain in sealing engagement with the respective ramp seals 42 and 52, maintaining the sealed integrity of the sealed zone. However, the radial load resistance of the frictional forces between the bump seals 38 and 48 and the respective ramp seals 42 and 52 is sufficiently reduced, without breaking the sealing, due to the contraction of the neck 22 and the expansion of the collar 24, to allow further rotation between the pin 10 and the box 12 by application of torque to the pin while the box is held fixed, for example. Thus, the pin 10 may be further rotated to continue the threading of the pin into the box 12.

As the pin 10 is further rotated and threaded into the box 12, the bump seals 38 and 48 continue to ride along the respective tapered ramp seals 42 and 52, tending to increase the radial load resistance forces at these seals. Consequently, fluid pressure in the sealed zone may be increased to further contract the pin neck 22 and expand the box collar 24 to maintain the resistance forces at the bumps seals 38 and 48 at sufficiently low values to allow further threading by rotation of the pin 10 into the box 12, while still maintaining the integrity of the sealed zone.

Ultimately, the pin 10 is threaded into the box 12 until the pin end face 26 lands on the box load shoulder 32, and the box end face 30 lands on the pin load shoulder 28. In that configuration, the pin bump seal 38 has moved into sealing contact with the cylindrical sealing surface 44 at the end of the box ramp seal 42, and the box bump seal 48 has moved into sealing contact with the cylindrical sealing surface 54 at the end of the pin ramp seal 52. Also, the pin thread load flanks 68 are in contact with the box thread load flanks 70. Additional application of torque to rotate the pin 10 relative to the box 12 and drive the pin farther into the box by the threading action produces axial load forces between the pin end face 26 and the box load shoulder 32, and between the box end face 30 and the pin load shoulder 28, and ultimately between the pin and box load shoulders 28 and 32, respectively, and also between the pin and box thread load flanks 68 and 70, respectively. After the maximum amount of available, or selected, torque has been applied to thus preload the connected pin 10 and box 12, the fluid pressure in the sealed zone is released by way of the line 60, for example, and the line and fitting 62 may be removed from the port 58. A plug (not shown) may be used to close the port 58.

With the pressure released from the sealed zone, the pin neck 22 tends to relax and expand radially, and the box collar 24 tends to relax and contract radially, with the result that the threads 34 and 36 move radially closer together. With the radial movement of the threads 34 and 36 closer together, the five degree slant of the thread load flanks 68 and 70, illustrated in FIG. 4, produces a wedging action between the two sets of threads that increases the axial preload between the threads and between the load shoulders 28 and 32. In general, the radial movement of the threads 34 and 36 together upon release of the fluid pressure in the sealed zone continues until the separation between the thread stab flanks 64 and 66, and the spacings between the thread crests 72,74 and the thread troughs 76,86, respectively, are reduced to approximately half those shown in FIG. 4. Also with the release of fluid pressure from the sealed zone, the bump seals 38 and 48 not only remain in sealing engagement with the cylindrical sealing surfaces 44 and 54, respectively, but the radial forces between these bump seals and the corresponding cylindrical sealing surfaces increase as the pin 10 expands and the box 12 contracts. With the fluid pressure released from the sealed zone, and the load shoulders 28 and 32, as well as the thread load flanks 68 and 70, axially preloaded with the wedging action between the threads 34 and 36, and the bump seals 38 and 48 radially loaded with the corresponding cylindrical seal surfaces 44 and 54, the final, completely made-up configuration of the connector assembly of the pin 10 and the box 12 is reached, as illustrated in FIG. 1. In this final, made-up configuration, with the axial preloading and radial loading as described, the connection of the two connectors 10 and 12 is effectively locked against breaking out by application of torque to rotate the pin 10 relative to the box 12 on the order of the maximum torque used to make up the connection.

It will be appreciated from the present disclosure that the bump seals 38 and 48, and the corresponding ramp seals 42 and 52, and cylindric sealing surfaces 44 and 54, provide metal-to-metal seals between the pin 10 and the box 12 in both directions: (a) from within the annular sealed zone during the process of making up the connection, confining the pressurized fluid in the sealed zone; and (b) from without the annular sealed zone in the final configuration, preventing fluid from passing into the sealed zone either from the interior of the pin 10 and box 12, or from exterior to the pin and box. In the particular embodiment illustrated, during the make up process both the pin bump seal 38 and the box bump seal 48 hold fluid pressure between the threads 34 and 36 in the sealed zone; in the completely made up configuration of FIG. 1, the pin bump seal seals fluid pressure inside the pin 10 and the box 12, and the box bump seal seals fluid pressure outside the pin and box.

The made up, final configuration of the connection between the pin 10 and box 12, shown in FIG. 1, may be broken out, and the pin and box separated, generally be reversing the steps of making up the connection. The line 60 is connected to the port 58 by the fitting 62, and fluid pressure is again applied to the sealed zone between the pin neck 22 and the box collar 24, forcing the neck and collar surfaces apart by contracting the neck and expanding the collar. This separation of the neck 22 and the collar 24 reduces the radial load resistance forces between the bump seals 38 and 48, and the cylindrical sealing surfaces 44 and 54, respectively, and also forces the pin threads 34 and the box threads 36 to move radially apart, reducing the axial preload that was generated at the load shoulders 28 and 32 by the wedging action of the threads on release of the fluid pressure during make-up. The connection between the pin 10 and the box 12 can then by unthreaded by application of torque to rotate the pin relative to the box, for example. When the position of FIG. 3 is reached, the fluid pressure in the sealed zone may be released, and the pin 10 further unthreaded from the box 12 by applied torque. Alternatively, the fluid pressure will be released from the sealed zone when the pin is withdrawn sufficiently relative to the box by unthreading that the bump seals lose sealing engagement with the conical seal surfaces.

Although the port 58 is illustrated as intersecting with the internal threads 36 of the box 12, the port may be located anywhere along the length of the box, including axially displaced from the internal threads, such as along the collar surface 50, or along the collar ramp seal 42, for example, as long as the port communicates with the sealed zone as defined above. Also, the port 58 may be closed by a plug (not shown) whenever the port is not in use.

As discussed above, the present invention may employ only one pair of contacting, generally annular, axial load surfaces included in the two connectors. For example, an end face of one of the pin or box connectors may provide a first, generally annular, axial load surface, and a load shoulder of the other connector from among the pin and the box may provide a second, generally annular, axial load shoulder. Then, fluid pressure is released from the sealed zone after the end face contacts the load shoulder to achieve the completely made up configuration.

The present invention provides a connector assembly that may be completely made up by rotation of one connector member relative to the other connector member alone to thread the two connector members together, as opposed to driving one connector member axially into the other connector member to achieve at least a part of the threading between the two members, or to at least latch the two members together. In the present invention, fluid pressure is applied between the two connector members to allow, or facilitate, the continued threading by rotation between the two connector members after radial load resistance at the seals stalls the torque applied to rotate and thread the connector members together, and is released from between the two connector members to axially preload the connector members together. Radial preloading at the seals is also achieved by the release of the fluid pressure. Metal-to-metal sealing between the two connector members is provided by bump seals and ramp seal surfaces, with optional cylindrical seal surfaces used in the made-up configuration. The bump seals and the various sealing surfaces seal in both directions, during make up, and after make up is achieved.

The foregoing disclosure and description of the invention is illustrative and explanatory thereof, and various changes in the method steps as well as the details of the apparatus may be made within the scope of the appended claims without departing from the spirit of the invention.

What is claimed is:

1. A method of making up a threaded connection between a pin connector and a box connector, wherein the pin connector includes a neck having external, tapered threads with leading stab flanks and slanted, trailing load flanks, and a first, generally annular, axial load surface, wherein the box connector includes a collar having internal, tapered threads with leading stab flanks and slanted, trailing load flanks, and a second, generally annular, axial load surface, wherein the neck and the collar provide two combinations of a bump seal and a corresponding conical seal surface, by meshing the external threads with the internal threads by relative rotation between the pin connector and the box connector and without otherwise applying axial forces to drive the two connectors together to make up the threaded connection, comprising the following steps:

a. inserting the neck of the pin connector into the collar of the box connector until the stab flanks of the external threads contact the stab flanks of the internal threads;
   b. rotating at least one of the pin connector and box connector relative to the other to mesh the external threads with the internal threads and so advance the neck into the collar, and to sealingly engage one of the combinations of a bump seal with the corresponding conical seal surface on one axial side of the meshed threads and sealingly engage the other combination of a bump seal and the corresponding conical seal surface on the other axial side of the meshed threads forming a generally annular sealed zone between the external threads and the internal threads and between the two bumps seals, and producing radial load resistance between the bumps seals and the respective conical seal surfaces as the bump seals are advanced along the corresponding conical seal surfaces;
   c. applying fluid pressure to the sealed zone to radially contract the neck and radially expand the collar to reduce the radial load resistance between the bump seals and the respective conical seal surfaces;

d. further rotating at least one of the pin connector and box connector relative to the other and so advance the neck into the collar until the first axial load surface contacts the second axial load surface; and e. releasing fluid pressure from the sealed zone to allow the neck to radially expand and the collar to radially contract to wedge the load flanks of the external threads with the load flanks of the internal threads and generate axial loading between the first axial load surface and the second axial load surface.

2. A method as defined in claim 1 wherein the step of applying fluid pressure to the sealed zone is first carried out when the rotation between the pin connector and the box connector to advance the neck into the collar is stalled due to the radial load resistance between the bump seals and the corresponding conical seal surfaces.

3. A method as defined in claim 1 further comprising, during the step of further rotating at least one of the pin connector and the box connector relative to the other with fluid pressure applied to the sealed zone, increasing the fluid pressure applied to the sealed zone to overcome increasing radial load resistance as the bump seals are further advanced along the corresponding conical seal surfaces.

4. A method as defined in claim 1 wherein the steps of applying fluid pressure to the sealed zone and of releasing fluid pressure from the sealed zone are carried out by communicating fluid pressure through a port provided in the collar of the box connector.

5. A method as defined in claim 1 wherein the step of releasing fluid pressure from the sealed zone with the first axial load surface in contact with the second axial load surface also increases radial loading between the pin connector and the box connector at the bump seals.

6. A method as defined in claim 1 further comprising providing a cylindrical seal surface at the end of each of the two conical seal surfaces such that, when the first axial load surface contacts the second axial load surface, each bump seal is in sealing engagement with a corresponding cylindrical seal surface.

7. A method as defined in claim 1 further providing:

a. the first, generally annular, axial load surface as an end face at the leading end of the neck;

b. a third, generally annular, axial load surface as a load shoulder at the opposite end of the neck;

c. a fourth, generally annular, axial load surface as an end face at the leading end of the collar;

d. the second, generally annular, axial load surface as a load shoulder at the opposite end of the collar;

e. the third and fourth axial load surfaces are in mutual contact when the first and second axial load surfaces are in mutual contact; and f. the step of releasing fluid pressure from the sealed zone to allow the neck to radially expand and the collar to radially contract to wedge the load flanks of the external threads with the load flanks of the internal threads generates axial loading between the first and second axial load surfaces and between the third and fourth axial load surfaces.

8. A method as defined in claim 7 further providing:

a. one of the combinations of a bump seal and a corresponding conical seal surface, respectively, as an external bump seal on the neck between the end face of the pin connector and the external threads, and an internal conical seal surface on the collar between the load shoulder of the box connector and the internal threads; and b. the other combination of a bump seal and a corresponding conical seal surface, respectively, as an internal bump seal on the collar between the end face of the box connector and the internal threads, and an external conical seal surface on the neck between the load shoulder of the pin connector and the external threads.

9. A method as defined in claim 8 further comprising providing an internal cylindrical seal surface at the end the conical seal surface on the collar toward the load shoulder of the box connector, and an external cylindrical seal surface at the end of the conical seal surface on the neck toward the load shoulder of the pin connector, such that the bump seal on the neck is in sealing engagement with the cylindrical seal surface on the collar and the bump seal on the collar is in sealing engagement with the cylindrical seal surface on the neck when the end face of the pin connector contacts the load shoulder of the box connector and the end face of the box connector contacts the load shoulder of the pin connector.

10. A method as defined in claim 1 further comprising the following steps to break out the made up threaded connection between the pin connector and the box connector:

a. applying fluid pressure to the sealed zone to radially contract the neck and radially expand the collar to reduce the radial load resistance at the bump seals; and b. rotating at least one of the pin connector and the box connector relative to the other to unthread the threaded connection between the pin connector and the box connector, and releasing the fluid pressure from the sealed zone.

11. A method as defined in claim 10 wherein the step of applying fluid pressure to the sealed zone with the threaded connection between the pin connector and the box connector completely made up also forces the pin threads and the box threads to moved radially apart, reducing the wedging of the pin thread load flanks and the box thread load flanks, and reducing the axial load between the axial load surfaces.

12. A method as defined in claim 1 further comprising providing at least two tubular members, with each tubular member being equipped with a box connector on one end and a pin connector on the other end, and connecting the tubular members together into a string of two or more tubular members by making up the threaded connection between the pin connector on one such tubular member with the box connector on another such tubular member according to the steps of claim 1, and repeating these steps until the string of tubular members is made up.

13. A connector assembly, including a threaded pin connector and a threaded box connector such that the threaded connection between the pin connector and the box connector may be completely made up by relative rotation between the two connectors and without the application of axial forces otherwise to drive the two connectors together, comprising:

a. the pin connector including a neck having external, tapered threads, with the thread profile including slanted load flanks, and a first, generally annular, axial load surface;

b. the box connector including a collar having internal, tapered threads, with the thread profile including slanted load flanks, and a second, generally annular, axial load surface;

c. the neck and the collar further including two combinations of a bump seal and a corresponding conical seal surface;

d. a fluid pressure communication port communicating between the interior of the collar and the exterior of the collar;

e. wherein, with the neck received within the collar and the external threads meshed with the internal threads through relative rotation between the pin connector and the box connector,
  i. one of the combinations of a bump seal and the corresponding conical seal surface seals the neck to the collar on one axial side of the meshed threads and the other combination of a bump seal and the corresponding conical seal surface seals the neck to the collar on the other axial side of the meshed threads to form a generally annular sealed zone between the two bump seals and between the external threads and the internal threads,
  ii. as the neck is advanced into the collar by relative rotation between the pin connector and the box connector with the internal threads and the external threads meshed, radial load resistance between the bump seals and the corresponding conical seal surfaces increases as the bump seals advance along the corresponding conical seal surfaces,
  iii. fluid pressure applied through the port to the generally annular sealed zone radially contracts the neck and radially expands the collar to reduce the radial load resistance between the bump seals and the corresponding conical seal surfaces and allow the pin connector to be further rotated and threaded into the box connector, and
  iv. with the pin connector advanced into the box connector by such rotation and threading with fluid pressure in the sealed zone such that the first axial load surface contacts the second axial load surface, release of fluid pressure from the generally annular sealed zone allows the neck to radially expand and the collar to radially contract to wedge the load flanks of the external threads with the load flanks of the internal threads and increase axial loading between the first axial load surface and the second axial load surface, and to increase the radial load resistance at the bump seals, to complete the make up of the threaded connection between the pin connector and the box connector.

14. A connector assembly as defined in claim 13 further comprising a cylindrical seal surface at the end of each of the two conical seal surfaces such that, with the first axial load surface contacting the second axial load surface, each bump seal is in sealing engagement with a corresponding cylindrical seal surface.

15. A connector assembly as defined in claim 13 further comprising:
  a. the first, generally annular, axial load surface being an end face at the leading end of the neck;
  b. a third, generally annular, axial load surface as a load shoulder at the opposite end of the neck;
  c. a fourth, generally annular, axial load surface as an end face at the leading end of the collar;
  d. the second, generally annular, axial load surface being a load shoulder at the opposite end of the collar;
  e. the third and fourth axial load surfaces are in mutual contact when the first and second axial load surfaces are in mutual contact; and
  f. releasing fluid pressure from the sealed zone to allow the neck to radially expand and the collar to radially contract to wedge the load flanks of the external threads with the load flanks of the internal threads increases axial loading between the first and second axial load surfaces and between the third and fourth axial load surfaces.

16. A connector assembly as defined in claim 15 wherein:
  a. one of the combinations of a bump seal and a corresponding conical seal surface is provided, respectively, as an external bump seal on the neck between the end face of the pin connector and the external threads, and an internal conical seal surface on the collar between the load shoulder of the box connector and the internal threads; and
  b. the other combination of a bump seal and a corresponding conical seal surface is provided, respectively, as an internal bump seal on the collar between the end face of the box connector and the internal threads, and an external conical seal surface on the neck between the load shoulder of the pin connector and the external threads.

17. A connector assembly as defined in claim 16 further comprising an internal cylindrical seal surface at the end the conical seal surface on the collar toward the load shoulder of the box connector, and an external cylindrical seal surface at the end of the conical seal surface on the neck toward the load shoulder of the pin connector, such that the bump seal on the neck is in sealing engagement with the cylindrical seal surface on the collar and the bump seal on the collar is in sealing engagement with the cylindrical seal surface on the neck when the end face of the pin connector contacts the load shoulder of the box connector and the end face of the box connector contacts the load shoulder of the pin connector.

18. A connector assembly as defined in claim 13 wherein the made up threaded connection between the pin connector and the box connector may be broken out by relative rotation between the two connectors and without the application of axial forces to otherwise pull the two connectors apart.

19. A connector assembly as defined in claim 18 wherein, with the threaded connection between the pin connector and the box connector made up, application of fluid pressure to the sealed zone radially contracts the neck and radially expands the collar to reduce the radial load resistance at the bump seals and also forces the pin threads and the box threads to moved radially apart, reducing the wedging of the pin thread load flanks and the box thread load flanks, and reducing the axial load between the axial load surfaces, to allow relative rotation between the two connectors to break out the threaded connection.

20. A connector assembly as defined in claim 13 further comprising at least two tubular members, with each tubular member being equipped with a box connector on one end and a pin connector on the other end, such that the tubular members may be connected together into a string of two or more tubular members by making up the threaded connections between the pin connectors and the box connectors of the tubular members.

* * * * *

UNITED STATES PATENT AND TRADEMARK OFFICE
CERTIFICATE OF CORRECTION

PATENT NO.  : 6,056,324
DATED       : May 2, 2000
INVENTOR(S) : Larry E. Reimert and James S. Britton It is certified that error appears in the above-identified patent and that said Letters Patent is hereby corrected as shown below:

On cover page 1, under the heading "U.S. PATENT DOCUMENTS," insert the following:
-- 2,636,753    4/1953     Griffin
   2,671,949    3/1954     Welton
   3,114,566    12/1963    Coberly et al.
   4,120,520    10/1978    Ahlstone
   4,124,229    11/1978    Ahlstone
   4,124,230    11/1978    Ahlstone
   4,124,231    11/1978    Ahlstone
   4,124,232    11/1978    Ahlstone
   4,124,233    11/1978    Ahlstone
   4,444,421    4/1984     Ahlstone
   4,648,627    3/1987     Reimert --.

On cover page 1, under the heading "FOREIGN PATENT DOCUMENTS," insert the following:
-- 1,573,945    8/1980     United Kingdom
   1,586,744    3/1981     United Kingdom
   2,033,518A   5/1980     United Kingdom
   2,064,041A   6/1981     United Kingdom
   2,087,022A   5/1982     United Kingdom
   2,099,529A   12/1982    United Kingdom
   2,113,335A   8/1983     United Kingdom --.

UNITED STATES PATENT AND TRADEMARK OFFICE
CERTIFICATE OF CORRECTION

PATENT NO. : 6,056,324
DATED : May 2, 2000
INVENTOR(S) : Larry E. Reimert and James S. Britton It is certified that error appears in the above-identified patent and that said Letters Patent is hereby corrected as shown below:

On cover page 1, under the heading "References Cited," and after the list of references under the heading "FOREIGN PATENT DOCUMENTS," insert the following:
-- OTHER PUBLICATIONS
 "SR-20 THREAD-LOK CONNECTOR" draft technical brochure of Vetco, Combustion Engineering, November, 1984, 44 pages.
 "The Hunting Merlin Connector" technical brochure of Hunting Oilfield Services (UK) Limited, November, 1984, or earlier, 32 pages. --
In column 1, at line 35, change "ad" to -- thread --.
In column 3, at line 21, change "contacts" to -- contracts --; and at line 24, change "ma" to -- may --.
In column 5, at line 2, change "is landed" to -- collar load --.
In claim 1, at line 31 of the claim, change "bumps" to -- bump --.

Signed and Sealed this

Third Day of April, 2001

Attest:

NICHOLAS P. GODICI

Attesting Officer   Acting Director of the United States Patent and Trademark Office